United States Patent [19]

Baroni et al.

[11] 4,275,837

[45] Jun. 30, 1981

[54] MOBILE APPARATUS ADAPTED TO FORM A DUCT FOR LIQUID FLOWS, PARTICULARLY FOR IRRIGATION PURPOSES

[76] Inventors: Dante Baroni, Via Grossi, 6, Mantova; Adelelmo Baroni, Via Giovanni XXIII, S. Nicolo' PO, Mantova, both of Italy

[21] Appl. No.: 76,632

[22] Filed: Sep. 18, 1979

[30] Foreign Application Priority Data

Sep. 26, 1978 [IT] Italy ............................... 18125 A/78

[51] Int. Cl.³ .............................................. A01G 25/00
[52] U.S. Cl. .................................. 239/197; 137/355.2; 239/709
[58] Field of Search ...................... 137/355.23, 355.24, 137/344, 373, 355.2; 239/191, 195, 197, 165, 213, 709, 718, 721

[56] References Cited

U.S. PATENT DOCUMENTS

| 1,370,252 | 3/1921 | Williams | 239/165 X |
| 3,675,721 | 7/1972 | Davidson et al. | 239/165 X |

FOREIGN PATENT DOCUMENTS

| 1524949 | 4/1968 | France | 239/213 |
| 434920 | 7/1974 | U.S.S.R. | 239/213 |

Primary Examiner—Andres Kashnikow
Attorney, Agent, or Firm—Guido Modiano; Albert Josif

[57] ABSTRACT

A liquid flow duct forming mobile apparatus particularly for irrigation comprises a plurality of telescopically coupled pipes, the largest diameter pipe thereof is fixed to a wheeled frame and provided at one end with a pressurized liquid supply line fitting. The smallest diameter pipe carries at one end an irrigator and each pipe of the series may be run out to an appropriate extent under the influence of the pressure applied by the liquid being pumped.

7 Claims, 8 Drawing Figures

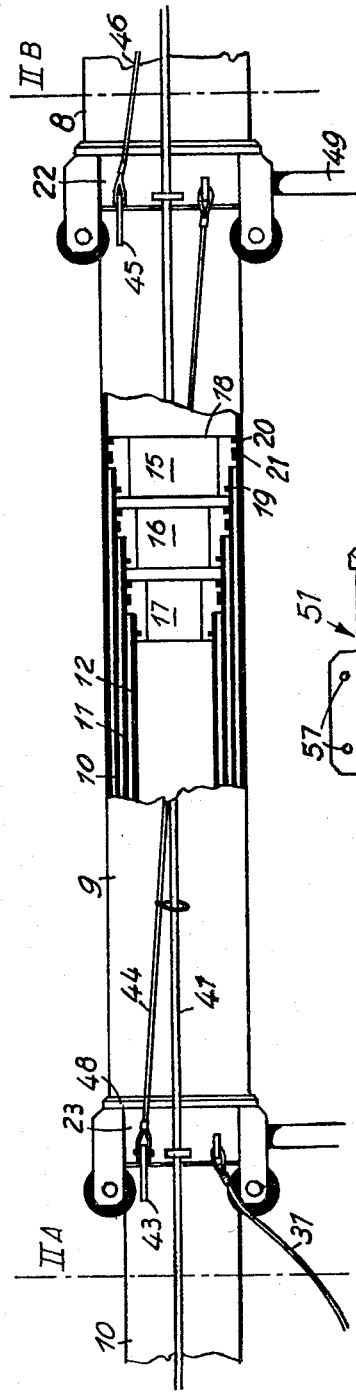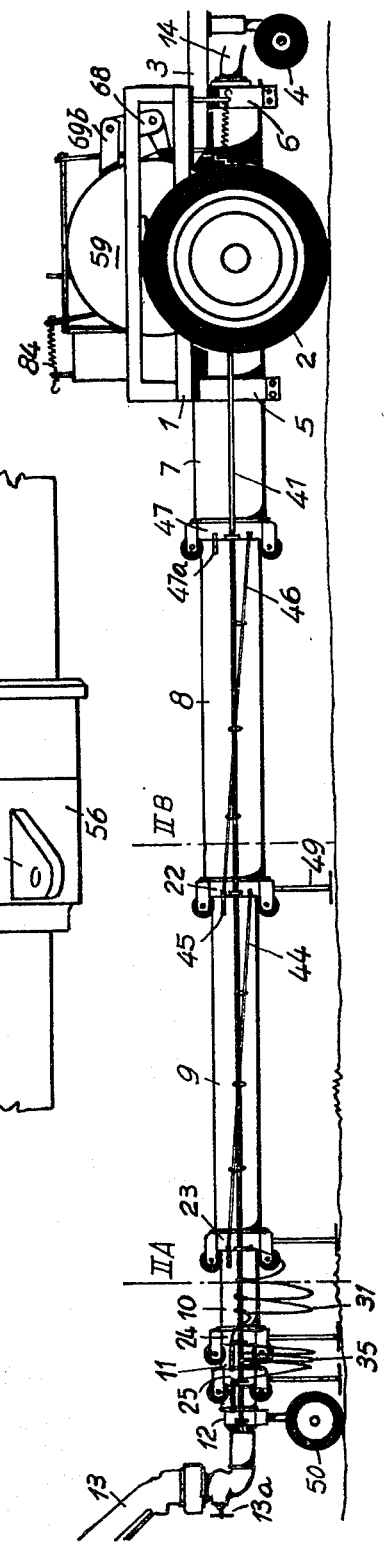

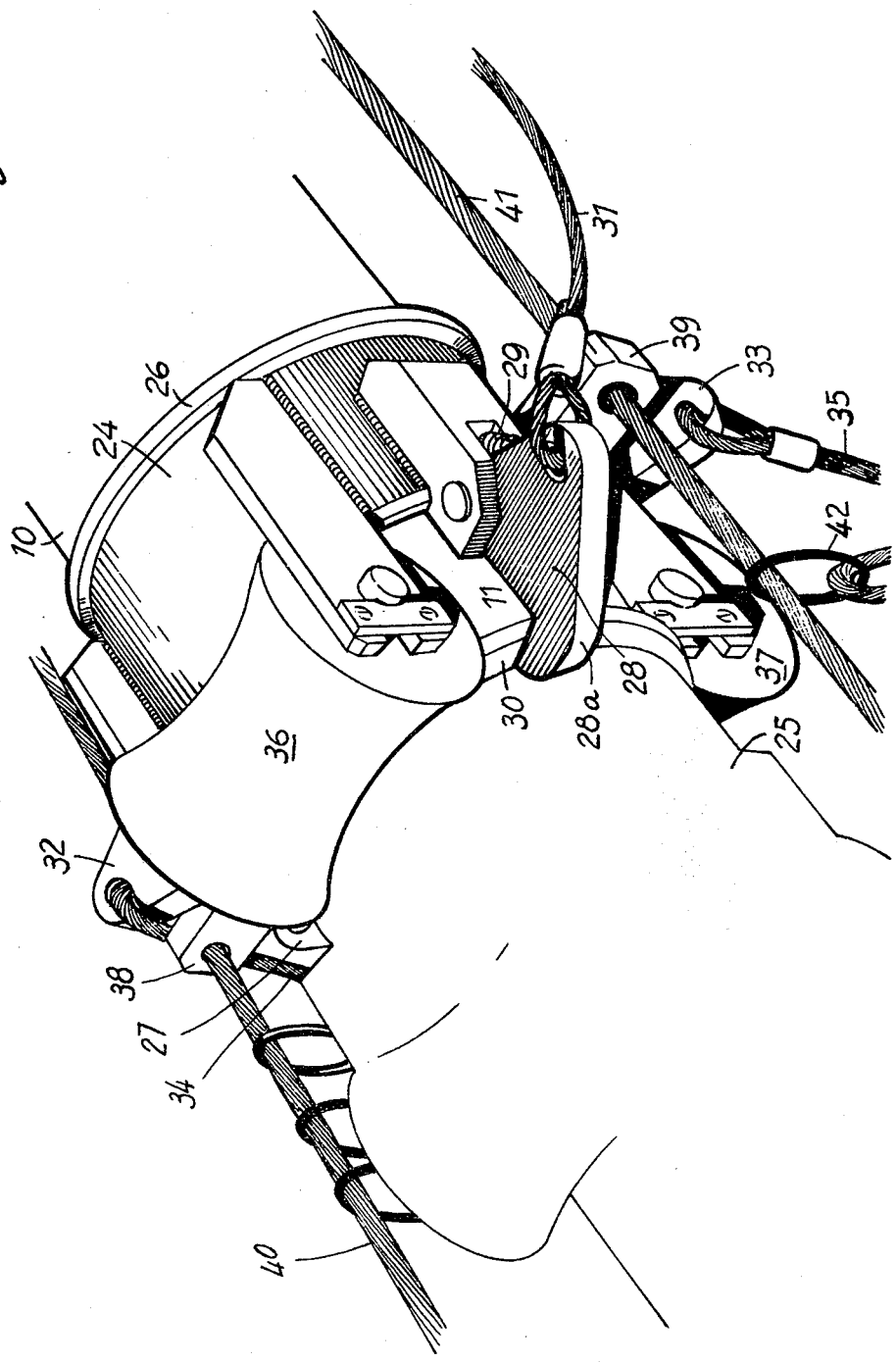

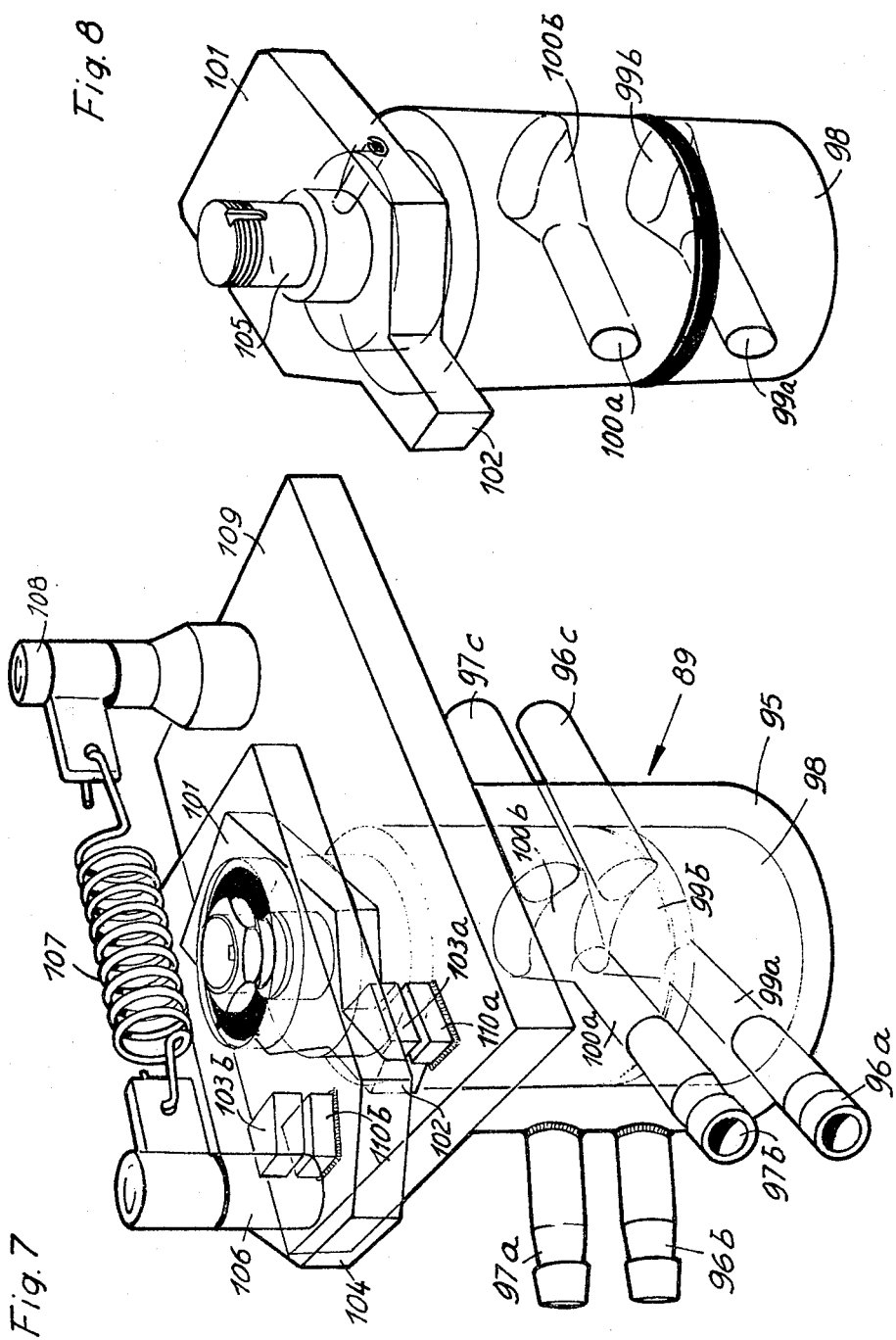

MOBILE APPARATUS ADAPTED TO FORM A DUCT FOR LIQUID FLOWS, PARTICULARLY FOR IRRIGATION PURPOSES

BACKGROUND OF THE INVENTION

This invention relates to a mobile apparatus adapted to form a duct for liquid flows through telescopically coupled pipes, particularly for irrigation purposes.

It is a well known fact that the conveyance of liquids presents, in any fields of application, including firefighting systems, marine, mining, oil-drilling and industrial plants in general, not to mention construction equipment, substantial problems. In fact, inefficient methods are often employed to that end which, while implying high installation costs, are insufficiently reliable in operation and short-lived. Moreover, conventional systems or apparata have heavy personnel requirements, which also aggravates their running costs.

A field where the transport of liquids, in particular water, is a major concern is that of agricultural irrigation.

For irrigating on plains, it is current practice to utilize, additionally to the traditional ground surface networks, several systems, automated to a greater or lesser degree and either stationary or mobile. In the instance of stationary systems, a widely accepted one is a system comprising a fixed central pivot shaft carrying two arms which are made to rotate by the reaction force of the water ejected from irrigators mounted to the arms themselves. In a frequently adopted variation of that system, the rotating arms connected to the central pivot shaft and carrying the irrigators are mounted on wheels intended for rolling over the ground surface under the propulsive force provided by the water itself or by an electric drive motor.

It will be appreciated that a basic drawback of such stationary systems resides in their high irrigation costs per acre, and mobile equipment, namely equipment that can be moved from one lot of land to another, have been developed, the more widely used whereof comprises a hydraulically operated reel around which a hose is wound to serve as the piping means for the water to flow to an irrigator unit located at the hose end. However, that type of equipment involves, similarly to other mobile apparatus, high running costs, owing to the hose, which has a constant throughout and rather small diameter with respect to the irrigator flow rate capacity, generating a high load drop, while it is heavy and awkward to handle, and quite expensive on account of its rather complex technology.

SUMMARY OF THE INVENTION

This invention sets out to provide a mobile apparatus for conveying liquids, which is convenient to install and versatile in use, it being adaptable to suit varying applicational requirements either by throttling it down, in an easily carried out manner well within the capabilities of an expert, or by combining it with other similar apparatus.

Within that general aim, it is possible to arrange that the apparatus according to this invention is simply constructed and accordingly long-lived and of low cost.

It is further possible to arrange that the inventive apparatus is economical to operate, thanks to the possibility of sizing the pipes which make up the ducting system to suit the required flow rates, thus affording a limited load drop.

According to one aspect of this invention, there is provided a mobile apparatus adapted to form a duct for liquid flows, particularly for irrigation purposes, characterized in that it comprises a series of telescopically coupled pipes, the largest diameter pipe in said pipe series being attached to a wheel-mounted frame for position changing and provided at one end with a fitting for connection to a pressurized liquid supply line, and the smallest diameter pipe in said pipe series carrying at one end means for ejecting the liquid in a desired condition, e.g. an irrigator, each pipe in said pipe series being provided with means enabling the pipes to be run out one by one to an appropriate extent, starting with the larger diameter pipes in said pipe series, under the influence of the pressure applied by the liquid being pumped to the inside of said pipe series, and with suitable sliding connection and sealing means; means for causing said pipe series to rest onto the ground; and means for telescopically returning the pipes in said pipe series from the fully extended position thereof to a telescopically packaged position.

BRIEF DESCRIPTION OF THE DRAWINGS

These and other functional and constructional features of the invention will be more clearly understood by making reference to the following detailed description of a preferred embodiment thereof, given herein by way of example only and relating to an irrigation apparatus, wherein the mechanism for causing the pipes to collapse or re-enter telescopically from their fully extended position comprises pull cords which are wound around drums rotatively driven by a cylinder unit which utilizes for the operating fluid that same pressurized liquid which is delivered through the supply line. A variation is also described of the means intended to facilitate the mutual sliding movement of the pipes.

In the drawings, which illustrate the embodiments just mentioned:

FIG. 1 is a side view of the apparatus with two pipes shown fully extended and the remainder on their way towards extension;

FIG. 2 shows a detail of FIG. 1 included between the sectional lines IIA and IIB, partly cut away at the inner heads of the pipes being extended;

FIG. 3 is a perspective view of the outer head of a pipe being extended, as contacting the outer head of the contiguous smaller diameter pipe;

FIG. 4 shows a variation of the outer head design, partly cut away;

FIG. 7 is a ghost line perspective view of a two-position control valve for the double-acting cylinder, shown with its distributor spool on the point of being actuated; and FIG. 8 is a perspective view, also in ghost lines, of the distributor spool of the valve shown in FIG. 7.

DESCRIPTION OF THE PREFERRED EMBODIMENTS

Figure 6:
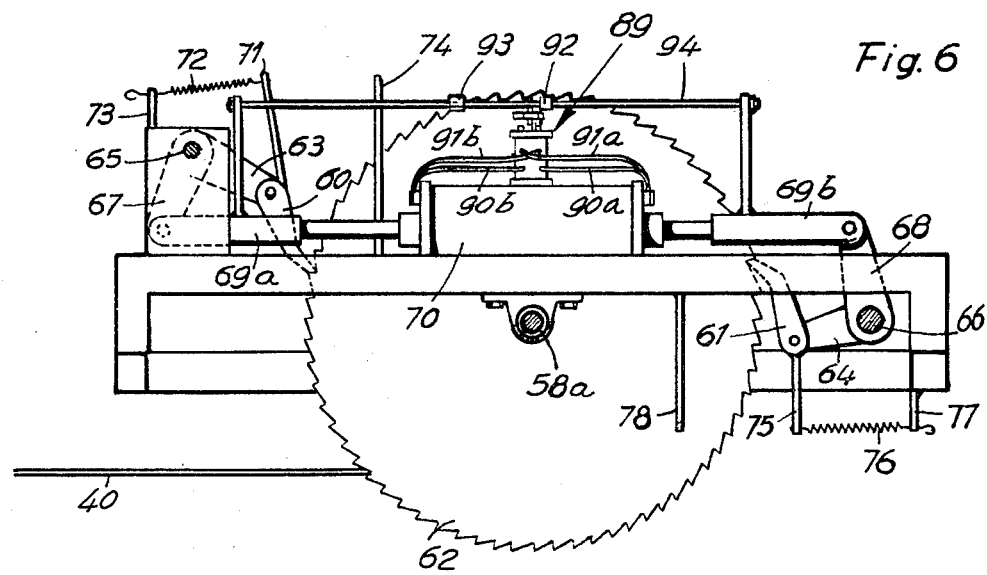
FIG. 6 is a sectional view taken along the line VI—VI of FIG. 5.

With reference to the drawing figures, the numeral 1 denotes a frame mounted on wheels 2 and having a hitch or draw bar 3 for attachment to a tractor, a steering wheel 4 being arranged at a level which allows the frame to bank as it is transferred from one place to another with all the pipes collapsed to a pack, thus ensuring that the duct or pipe series supporting means, comprising a carriage and rods which will be explained hereinafter, are lifted off the ground.

To the frame 1 is attached, by means of straps 5 and 6, the largest diameter pipe in the series, 7, which is intended for containing all of the other pipes in telescopically coupled relationship, the rest of the pipes including five pipes 8 in the example shown. The pipes 8 and 9 are fully extended, whereas the pipe 10, which contains the pipe 11 and pipe 12 and carries the irrigator 13 with its control gate valve 13a, is being extended.

While the pipe 7 is provided with a fitting for connection to the line 14 supplying pressurized water, the five movable pipes are provided at their water inlet ends with inner heads, whereof in FIG. 2 only the ones for pipes 10,11,12 are shown, respectively at 15,16,17. Each head, e.g. 15, presents an annulus-like surface 18 upon which the water under pressure impinges during the extension phase, as will be more clearly explained hereinafter with reference to the apparatus operation, and has sealing gaskets 19 and 20 ensuring tightness and a ring 21 made of an anti-friction material for facilitating the sliding contact movement along the inner wall of the contiguous larger diameter pipe.

The intermediate pipes 8,9,10 and 11 have at their liquid outlet ends identical outer heads, respectively indicated at 22,23,24 and 25, whereof only the one mounted to the pipe 10, and denoted with the reference numeral 24, will be described in FIG. 3.

Said head comprises a ridge 26 and carries hingedly connected thereto at diametrically opposed locations hooks 27 and 28, the latter being clearly represented in its engaged position as due to the bias applied by a spring 29 with a ridge 30 presented by the head 25 of the pipe 11; to the hook 28 is secured one end of a cord 31, the other end whereof is attached, as shown in FIG. 1, to the head 23 of the pipe 9; obviously, a similar cord will be connected to the hook 27. The hooks just mentioned are shaped at their backs, e.g. 28a for the hook 28, such that the thrust applied thereto by the ridge 30 as the pipes are being withdrawn telescopically, as explained hereinafter, causes the hooks to raise against the bias of their springs, such as 29, thereby said ridge 30 resumes its position shown in the figure. The head 24 also supports tabs 32 and 33 whereto the cords 34 and 35 are connected with one end, their other ends being connected to the hooks provided on the head 25, not shown in FIG. 3, as can be seen in FIG. 1 for the cord 35.

For a complete description of the head 24, it should be added that the numerals 36 and 37 denote rollers carried thereby for the sliding movement of the pipe 11, whilst 38 and 39 denote leaders for the main cords 40 and 41 of the pipe telescoping mechanism, as will be explained hereinafter, whereto there are connected, as by means of rings 42, the cords, such as 35, for connection to the heads, in order to avoid their causing encumbrance on the ground.

As mentioned in the foregoing, the heads 22,23,24 and 25 are all identical: thus, for example, the head 23 carries two hooks, such as 43, intended for engagement with the ridge 26 of the head 24, and is connected through the cord 44 to the head 22 carrying, in turn, two hooks, such as 45, which are connected through the cord 46 to the head 47 of the stationary or fixed pipe 7 and are adapted for engaging the ridge 48 of the head 23: said head 47 is similar to the other heads, excepting for the provision of two hooks, such as 47a, which are manually controlled to block the pipe 8 along with the pipe pack contained therein with respect to the pipe 7 while the apparatus is being transferred from one place to another.

To the heads 22,23,24 and 25, there are connected small rods, such as 49, for the head 22, which serve for resting the duct onto the ground, the duct being supported at the outlet end of the terminating pipe 12 by the wheeled carriage 50.

The operation of the apparatus can now be described as during the pipe extension phase from their packed or collapsed position where they are all contained inside the pipe 7. As the pressurized liquid reaches the inside of the pipe 7, owing to the action of the liquid against the inner heads, the pipe 8 is first pushed out which contains the smaller diameter pipes locked inside it by the various hooks; thus, two hooks, such as 45, withhold the pipe 9 by engaging the ridge 48 on the head 23 thereof, hooks, such as 43, withhold the pipe 10 by engaging the ridge 26 on the head 24, and so forth. As the pipe 8 reaches its fully extended position, the cord 46 comes under tension, blocks the pipe against moving out, and acts on the hook 45 to release it from its contact with the ridge 48 of the head 23, the same obviously occurring with the other hook, such as 45. Thus, the pipe 9 is allowed to slide out with the smaller diameter pipes locked inside it, until, upon reaching its fully extended position as determined by the cord 44 coming under tension, the hook 43 disengages itself from the ridge 26 on the head 24 and releases the pipe 10. In a similar manner to the above, the subsequent pipes are extended.

As the pipes are moved out, the duct flexes somewhat under its own weight to cause the rods, such as 49, to gradually contact the ground, whilst the carriage 50 supports the moving end thereof until all of the pipes have been fully extended.

FIG. 4 shows an outer head 51 according to another embodiment or variation of this invention, wherein the sliding movement of the smallest diameter pipe 52 occurs in contact with the anti-friction material rings 53 and 54, instead of the rollers. In said head, the hooks and tabs, such as 55, are attached to a strap 56 which is tightened around the head by means of bolts passed through holes 57.

Figure 5:
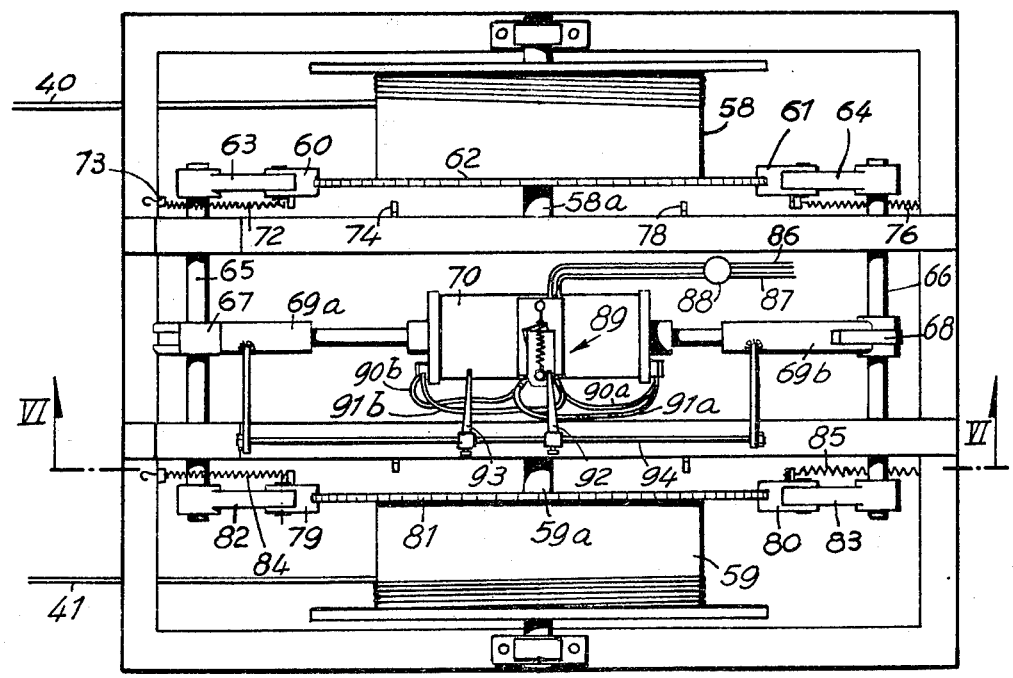
FIG. 5 is a plan view of the mechanisms intended for rotatively driving the wind-up drums for the cords which pull back the pipes from their fully extended position, the piston rod of the double-acting cylinder unit being represented at its leftward stroke end; the figure does not show, for clarity of representation, the frame driving members and the pipe attached thereto.

With reference in particular to FIGS. 5 and 6, the means will now be described for withdrawing the pipes from their fully extended position, according to a preferred solution. In said Figures, there are indicated at 58 and 59 the drums for winding the main cords 40 and 41 which are attached with one end to the liquid outlet end of the pipe 12, as is clearly visible in FIG. 1. The rotation of the drum 58, supported by an axle 58a, is determined by pawls 60 and 61 engaging a ratchet wheel 62 and being pivoted to cranks 63 and 64 keyed to shafts 65 and 66 which are reciprocated by virtue of their being connected, through the cranks 67 and 68, to the ends of the two halves of a split piston rod, respectively 69a and 69b, of a double-acting cylinder 70.

The pawl 60 is provided with a lug 71 whereto is attached one end of a spring 72, the other end whereof can be anchored to the small rod 73 when it is desired that the pawl contacts the ratchet wheel, or to the small rod 74 when the pawl must be disengaged from the ratchet wheel; similarly, the pawl 61 has a lug 75 with a spring 76 which can be connected with the small rods 77 or 78, depending on whether the pawl is to contact the ratchet wheel or not.

Simultaneously with the drum 58, the drum 59 is rotatively driven in a similar manner which is carried on an axle 59a, by means of pawls 79 and 80 engaging a ratchet wheel 81 and being pivoted to cranks 82 and 83 which are keyed to the shafts 65 and 66; obviously, these pawls will also be provided with respective springs 84 and 85 having the same function as explained with reference to springs 72 and 76.

The double-acting cylinder 70 receives its operating fluid, which in the present case is the same pressurized liquid being conveyed through the duct, over the pipe 86, and discharges it through the pipe 87. Such pipes, which are equipped with a flow rate regulator 88 for controlling the drum revolutions per minute and accordingly the rate of withdrawal or collapse of the duct, are connected to a control valve, generally indicated at 89, wherefrom there branch off delivery pipe 90a 90b to the two sides of the piston and discharge pipes 91a and 91b therefrom. The valves 89 is actuated for reversal of the piston motion through the lugs 92 and 93 which are carried by the rod 94 connected to the piston rod halves 69a and 69b in an adjustable manner for a correct setting.

The control valve 89 will be now described with reference to FIGS. 7 and 8, wherein there is indicated at 95 the valve body having a pair of conduits 96a and 96b, adapted for connection to the delivery pipes 90a and 90b, respectively, and a conduit 96c, located in the same plane as the previously mentioned conduits along the line bisecting the angle therebetween, which is intended for connection to the liquid delivery pipe 86. The valve body further includes conduits 97a and 97b adapted for connection to the discharge pipes 91a and 91b, respectively, as well as a conduit 97c located in the same plane as the previous conduits along the line which bisects the angle included therebetween and intended for connection to the liquid outlet pipe 87.

Inside the body 95, there is a distributor spool 98 provided with two diametrical bores or holes, which are formed by two cylindrical portions 99a and 100a, and flared portions 99b and 100b, respectively, in the planes containing the valve body conduits just described. With the spool or cylinder 98, a block 101 is rigid which is provided with a lug 102 intended for contacting detents 103a and 103b projecting from a plate 104 which is pivoted to the pin 105 and provided with a peg 106 adapted to contact the lugs 92 and 93 of the actuating mechanism.

Finally, there is indicated at 107 a spring having one end connected to the peg 106 and the other end connected to the pin 108, which is located on the fixed plate 109 such that a line joining the axes of the peg 106 and pin 108 itself, in the fully extended position of the spring following rotation of the plate 104, intersecates the rotation axis of said plate; from the plate 109 there also project travel limit stops 110a and 110b for the lug 102.

It will be apparent from the foregoing that in order to have the pipes perform their withdrawal or collapsing movement, during which phase or step, in the case of an irrigation type of apparatus, the irrigator 13 is operated which rotates through 180° and is controlled from the start to the end of that phase or step by the gate valve 13a, it is sufficient that the pawls, which during the previous extension phase of the pipes where raised from their respective ratchet wheels to render the drums 58 and 59 idle, be brought again into contact with said ratchet wheels, and that the operating fluid be delivered to the cylinder unit 70. Thus, the drums are caused to rotate, and the main cords 40 and 41, in winding around them, cause the pipes to re-enter or telescope back one by one, starting with the smallest diameter one whereto they are directly connected; re-hooking of the heads is an automatic process because, as mentioned already, the hooks are so shaped at their backs as to cause the thrust of the lower diameter head thereagainst to produce that raising movement against the spring bias.

To explain the mode of operation of the mechanism which rotates the drums 58 and 59, the description is more aptly begun from the situation shown in FIGS. 5, 6 and 7. There the piston of the cylinder 70 has reached its leftward end of travel or stroke end, and the entire stroke just completed, during which the pawls 60 and 79 in contact with one tooth on the wheels 62 and 81 have maintained the drums in rotation while the pawls 61 and 80 have completed their passive stroke, has occurred with the distributor spool or cylinder 98 in the position shown, to admit the power fluid, as introduced through the conduit 96c, through the hole 99b and 99a up to the conduit 96a connected to the delivery pipe 90a, and with the discharge occurring through the pipe 91b connected to the conduit 97b and the hole 100a and 100b up to the outlet conduit 97c; during that stroke, the contact between the lug 92 and peg 106 causes the plate 104 to rotate from the position with the ridge 103b contacting the lug 102, to the position shown in FIG. 7, with the ridge 103a contacting the lug 102.

At this point, the spring 107, which has reached its maximum tension, produces an instantaneous leftward rotation of the plate 104 which entrains the lug 102 and consequently actuates the distributor spool 98 such that the holes 99a and 100a are brought into alignment with the conduits 96b and 97a, whilst the flared portions 99b and 100b remain at all times in communication with the conduits 96c and 97c, and the peg 106 moves to contact the lug 93, which will accompany it during the following stroke. Thus reversal of delivery and discharge is obtained, and therealong the stroke of the piston in the opposite direction to the former, thereby the drums will be rotated by the pawls 61 and 80, whereas the pawls 60 and 79 actuate the passive stroke.

The invention as described is susceptible to many modifications and variations, all of which fall within the scope of the instant inventive concept. Thus, for example, each pipe could be blocked against sliding out by using bushings of different diameters, attached to the ends, or abutting stops, or profiles formed directly on the pipe. The cord wind-up drums which serve for collapsing the pipe series could be driven rotatively by any type of motive power, or said collapsing movement could be obtained by means of a pressure system acting either externally or internally to the pipes themselves. The pipes can be made of steel, aluminum, plastics, or any other material suitable for this application, even when the presence of chemical-physical agents, such as corrosive matter, heat or low temperatures, is contemplated which may be encountered where the apparatus is used other than for irrigation purposes.

We claim:

1. A mobile apparatus adapted to form a duct for liquid flows, particularly for irrigation purposes, comprising a series of telescopically coupled pipes, the largest diameter pipe in said pipe series being attached to a wheel-mounted frame for position changing and provided at one end with a fitting for connection to a pressurized liquid supply line, and the smallest diameter pipe in said pipe series carrying at one end means for ejecting liquid in a desired condition, e.g. an irrigator, each pipe in said pipe series being provided with means enabling said pipes to be run out one by one to an appropriate extent, starting from said largest diameter pipe in said pipe series, under the influence of the pressure applied by said liquid when pumped into said pipe series, and with suitable sliding connection and sealing means; means for causing said pipe series to rest onto the ground; and means for telescopically collapsing said pipes in said pipe series from a fully extended position thereof to a telescopically packaged position wherein each of said pipes has a liquid inlet end and a liquid outlet end and a head at said liquid outlet end, said head having a ridge thereon, and wherein each of said pipes in said pipe series excepting said largest diameter pipe and said smallest diameter pipe has on said head at least two hooks symmetrically arranged around the pipe, each of said hooks being hingedly connected to the corresponding pipe such as to rotate in a substantially radial plane between a position engaging said ridge on said head of the contiguous pipe having a smaller diameter, and a position disengaged from said ridge, said hooks being each connected to a respective spring accommodated on a corresponding of said heads such as to cause the corresponding of said hooks to rotate towards said engaging position thereof, and to one end of a respective cord having an other end attached to said head of the contiguous pipe having a larger diameter, the length of said cord being such as to cause said cord to come under tension and lock the respective of said pipes from sliding further out and the respective of said hooks from rotating, against the bias of said spring, towards said disengaged position thereof upon said respective pipe reaching its fully extended position, thereby the contiguous smaller diameter pipe is released and allowed to move out under the influence of the pressure of said liquid, each of said hooks having a back portion shaped such that the pressure exerted thereon during the collapsing phase of said pipe series by said ridge provided on the head of the smaller diameter contiguous pipe causes the raising thereof and re-hooking of said head.

2. A mobile apparatus according to claim 1, wherein said means for telescopically collapsing said pipe series from said fully extended position thereof into said packaged position comprise main cords arranged between said largest diameter pipe and said smallest diameter pipe, and rings on said main cords wherethrough said cords for controlling said hooks are caused to pass.

3. A mobile apparatus according to claim 1, wherein said hooks are connected to a strap adapted for attachment to a respective one of said heads by means of bolts.

4. A mobile apparatus according to claim 1, wherein said means for telescopically collapsing said pipe series from said fully extended position thereof into said packaged position comprise a plurality of main cords, preferably two such main cords, at diametrically opposed positions, connected at one end to said head of said smallest diameter pipe and wound around drums carried by a pipe supporting frame such as to unwind said main cords from said drums when said pipe series are extended by means of said pressurized liquid, means operative to render said drums idly rotatable when said pipe series are to be extended, and means for rotating said drums and winding said main cords around said drums when said pipe series must be telescopically collapsed, wherein said means for rotating said drums in order to cause said pipe series to collapse telescopically comprise a ratchet wheel rigidly mounted on each of said drums, two pawls at substantially diametrically opposite positions of said ratchet wheel, two reciprocating shafts adjacent said pawls, each of said reciprocating shafts carrying a crank pivotally supporting a respective one of said pawls, and means for reciprocating said shafts at the same period and in opposite directions, said means for reciprocating said shafts comprising a double-acting cylinder having piston rods projecting from opposite sides thereof and each connected to a respective crank rigid with a respective one of said reciprocating shafts such that to an active stroke of one of said pawls, in the same direction as said ratchet wheel and in engagement with one tooth there of, there corresponds a passive stroke, in the opposite direction, of the other of said pawls.

5. A mobile apparatus according to claim 4, wherein said means operative to render said drums idly rotatable comprise two fixed supports for each of said pawls, said two fixed supports being located on opposite sides with respect to the pivot axis of the respective of said pawls, and a spring for each of said pawls, said spring having one end connected to the respective of said pawls and another end selectively connected to one of said two fixed supports, depending on whether the respective of said pawls must contact said ratchet wheel during the collapsing phase of said pipe series, or must be removed from contact with said ratchet wheel in order to render the respective of said drums idly rotatable during the extension phase of said pipe series.

6. A mobile apparatus according to claim 4, further comprising means for supplying said double-acting cylinder with said pressurized liquid, said means comprising a flow rate regulator effective to vary the rate of collapse of said pipe series, and a two-position control valve actuated through lugs extending from said piston rod and adjustably positioned therealong.

7. A mobile apparatus according to claim 6, wherein said two-position control valve for controlling said double-acting cylinder comprises a valve body in the form of a hollow cylinder including a pair of delivery conduits for said pressurized liquid and a pair of discharge conduits therefor, radially arranged in planes perpendicular to the cylinder axis and including therebetween an angle, on a bisecting line whereof there is located, at a diametrically opposed position, a liquid inlet conduit arranged level with said pair of delivery conduits and a liquid outlet conduit arranged level with said pair of discharge conduits; a distributor spool having two diametrically located bores contained in a same plane as said conduits provided on said valve body, said bores being configured as a cylindrical portion on a side of said conduit pairs followed by a portion flared in accordance with a sector of a circle subtending an angle equal to the angle included between said conduits forming said pairs in said valve body, said distributor spool having a lug perpendicular to the rotation axis thereof and said valve further comprising a plate pivoted to said valve body at the rotation axis of said distributor spool and contacting directly said actuating lugs rigidly mounted on said piston rod, said plate having detents wherewith said lug of said distributor spool makes contact when the piston rod movement is to be reversed; a spring having one end attached to said plate and another end attached to a fixed plate comprising two travel limit stops for the rotative movement of said distributor spool, said travel limit stops being located on opposite sides with respect to said rotation axis of said plate, such that in a fully extended position said spring intersecates said rotation axis.

* * * * *